Figure 1:
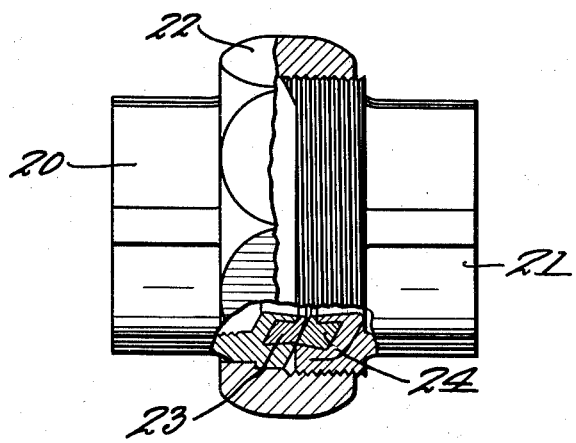

July 31, 1934.   P. LOFGREN   1,968,562
FEMALE PIPE COUPLING MEMBER
Filed Feb. 6, 1931

Patented July 31, 1934

1,968,562

UNITED STATES PATENT OFFICE 1,968,562

FEMALE PIPE COUPLING MEMBER

Peter Lofgren, Worcester, Mass., assignor to Rockwood Sprinkler Company of Massachusetts, Worcester, Mass., a corporation of Massachusetts Application February 6, 1931, Serial No. 514,017

1 Claim. (Cl. 137—75)

This invention relates to pipe couplings of the type in which a non-corrosive seating ring is provided in the contacting face of each coupling member.

The details of construction of the male coupling member form the subject matter of my copending application Serial No. 514,016, filed by me on even date herewith.

This application relates particularly to the female coupling member and to a novel and improved construction therein.

It is the general object of my present invention to provide a female pipe coupling member of such construction that it may be conveniently formed from a sheet metal blank by successive press and drawing operations.

A further object is to provide a female pipe coupling member adapted to support a non-corrodible seating ring of minimum cross section and to firmly secure the seating ring against displacement in said coupling member.

My invention further relates to certain arrangements and combinations of parts which will be hereinafter described and more particularly pointed out in the appended claim.

A preferred form of the invention as shown in the drawing, in which

Figure 2:
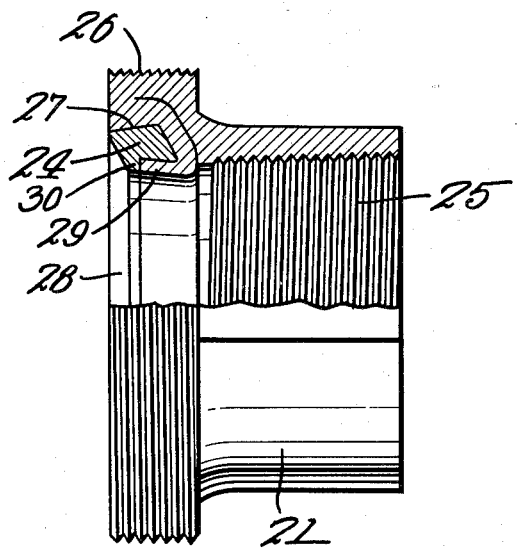

Fig. 1 is a side elevation, partly in section, of my improved pipe coupling, and Fig. 2 is an enlarged side elevation, partly in section, of the improved female coupling member.

Referring to Fig. 1, I have shown a pipe coupling comprising a male coupling member 20, a female coupling member 21 and a clamping nut 22. A seating ring 23 is assembled in the face of the male coupling member 20 and a seating ring 24 is assembled in the face of the female coupling member 21. The nut 22 is of a usual commercial form and the male member 20 forms the subject matter of a copending application, as above stated.

The present application relates particularly to the improved construction of the female coupling member 21. The body portion of this coupling member 21 is preferably formed from relatively heavy sheet steel, and the seating ring 24 is preferably formed of brass, bronze or other non-corrodible metal.

The body portion of the female coupling member 21 is preferably produced by subjecting a sheet steel blank to successive press operations to give it the cross sectional area indicated in Fig. 2. The body portion is internally threaded as indicated at 25 and is externally threaded as indicated at 26.

The body portion thus produced has an end portion enlarged both inwardly and outwardly, as shown in Fig. 2 and provided with a groove or recess 27 in its end face.

The non-corrodible seating ring 24 is provided with a concave outer end surface 28 and with a concave inner end surface which is in contact with the concave conical bottom surface of the groove or recess 27. The seating ring 24 is of irregular but essentially diamond-shaped cross section, and the inner and outer walls of the ring converge slightly toward the outer end surface thereof.

After the ring 24 is placed in the groove or recess 27, the inner and outer walls of the recess 27 are upset and forced into close binding engagement with the slightly converging adjacent surfaces of the seating ring, so that the seating ring is firmly retained in dove-tailed engagement with the body portion of the coupling and is firmly seated against the concave conical bottom surface of the groove or recess 27.

The inner wall 29 of the body member preferably terminates below the outer surface 28 of the seating ring, and the seating ring 24 is preferably provided with a flange 30 extending inward over the upper edge of the wall 29.

From the above description, it will appear that I have produced a female pipe coupling member adapted to be formed from a sheet metal blank by a series of press operations and constituting reversely superposed layers of manipulated metal, and that I have firmly secured a seating ring of non-corrodible metal in the engaging end face of the coupling member. Furthermore, it will be seen that a concave conical bearing surface of limited width is provided by the seating ring 24 which is also of minimum practical cross section, so that a very small amount of the more expensive non-corrodible metal is required.

Another important advantage of my improved construction is that the seating ring 24 is firmly confined on three sides by the metal of the coupling member, so that leakage of steam or gas around the seating ring is entirely avoided. The final assembly operation places the ring 24 and the metal at each side thereof under compression. Any subsequent change in the section of the ring upon release from the die pressure merely has the effect of tightening the ring more closely against the enclosing metal of the coupling member.

Having thus described my invention and the advantages thereof, I do not wish to be limited to the details herein disclosed, otherwise than as set forth in the claim, but what I claim is:—

A female pipe coupling member comprising a tubular body portion having an integral end portion upset and enlarged outwardly and constituted by reversely superposed layers of manipulated metal, and a non-corrodible seating ring having a concave outer end surface and a convex inner end surface, said ring being embedded and firmly secured in a groove in the outer end face of said upset portion in position to contact with a convex seating ring in an associated male coupling member, said groove in said end face having a concave, conical bottom surface, said ring being of irregular but essentially diamond-shaped cross section and the inner and outer walls of said ring converging slightly toward the concave outer end surface thereof, and the walls of said groove in said upset end portion snugly engaging said converging inner and outer walls of said rings when assembled therewith and retaining said ring in place by dove-tailed engagement therewith and firmly seating said ring against the concave bottom surface of said groove.

PETER LOFGREN.